US009850922B2

(12) United States Patent
Yang et al.

(10) Patent No.: US 9,850,922 B2
(45) Date of Patent: Dec. 26, 2017

(54) SOFT BUCKLING ACTUATORS

(71) Applicant: President and Fellows of Harvard College, Cambridge, MA (US)

(72) Inventors: Dian Yang, Cambridge, MA (US); George M. Whitesides, Newton, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 411 days.

(21) Appl. No.: 14/685,461

(22) Filed: Apr. 13, 2015

(65) Prior Publication Data

US 2015/0337873 A1 Nov. 26, 2015

Related U.S. Application Data

(60) Provisional application No. 61/979,267, filed on Apr. 14, 2014, provisional application No. 62/025,766, filed on Jul. 17, 2014.

(51) Int. Cl.
*F16D 31/02* (2006.01)
*F15B 15/10* (2006.01)
*F15B 15/02* (2006.01)

(52) U.S. Cl.
CPC .............. *F15B 15/10* (2013.01); *F15B 15/02* (2013.01)

(58) Field of Classification Search
CPC ............................... F15B 15/10; F15B 15/103
See application file for complete search history.

(56) References Cited

U.S. PATENT DOCUMENTS

| | | | |
|---|---|---|---|
| 6,168,634 | B1 | 1/2001 | Schmitz |
| 6,215,221 | B1 | 4/2001 | Cabuz et al. |

(Continued)

FOREIGN PATENT DOCUMENTS

| | | | |
|---|---|---|---|
| GB | 2240083 A | | 7/1991 |
| WO | WO-2012/148472 | A2 | 11/2012 |
| WO | WO-2014/015146 | A2 | 1/2014 |

OTHER PUBLICATIONS

"Soft Robots: Make an Artificial Muscle Arm and Gripper", Instructables [online]. Sep. 6, 2012; retrieved Sep. 21, 2015, Retrieved from the internet: <https://web.archive.org/web/20120906041447/http://www.instructables.com/id/soft-robots-make-an-artificial-muscle-arm-and-gri/?allsteps>; pp. 2-3, 5-6, 8-9.

(Continued)

*Primary Examiner* — Michael Leslie
(74) *Attorney, Agent, or Firm* — Wilmer Cutler Pickering Hale and Dorr LLP

(57) ABSTRACT

A soft actuator is described, including: a rotation center having a center of mass; a plurality of bucklable, elastic structural components each comprising a wall defining an axis along its longest dimension, the wall connected to the rotation center in a way that the axis is offset from the center of mass in a predetermined direction; and a plurality of cells each disposed between two adjacent bucklable, elastic structural components and configured for connection with a fluid inflation or deflation source; wherein upon the deflation of the cell, the bucklable, elastic structural components are configured to buckle in the predetermined direction. A soft actuating device including a plurality of the soft actuators and methods of actuation using the soft actuator or soft actuating device disclosed herein are also described.

24 Claims, 11 Drawing Sheets

(56) References Cited

U.S. PATENT DOCUMENTS

| | | | | |
|---|---|---|---|---|
| 9,464,642 | B2 * | 10/2016 | Ilievski | F15B 15/10 |
| 2003/0159219 | A1 | 8/2003 | Harrison et al. | |
| 2005/0132490 | A1 | 6/2005 | Davis | |
| 2007/0186712 | A1 | 8/2007 | Ferraresi et al. | |
| 2010/0117039 | A1 | 5/2010 | Perrett et al. | |
| 2016/0017899 | A1 * | 1/2016 | Yang | F15B 15/103<br>92/90 |
| 2016/0114482 | A1 * | 4/2016 | Lessing | F15B 15/103<br>92/89 |
| 2016/0190431 | A1 | 6/2016 | Zeng et al. | |
| 2017/0021284 | A1 * | 1/2017 | Murison | F15B 13/06 |

OTHER PUBLICATIONS

International Search Report and Written Opinion dated Oct. 19, 2015 in the international application: PCT/US15/40896, filed Jul. 17, 2015, 11 pages.
International Search Report and Written Opinion issued by the U. S. Patent and Trademark Office as International Searching Authority for International Application No. PCT/US2015/025603 dated Jul. 7, 2015 (8 pages).

* cited by examiner

FULLY ACTUATED

UNACTUATED

SOFT BUCKLING ACTUATORS

RELATED APPLICATION

The present application claims priority to U.S. Provisional Application 61/979,267, filed Apr.14, 2014, and to U.S. Provisional Application 62/025,766, filed Jul. 17, 2014, the contents of which are hereby incorporated by reference herein in their entirety.

GOVERNMENT FUNDING CLAUSE

This invention was made with support from the United States government under Grant No. DMR-0820484 awarded by the National Science Foundation, and Grant No. DE-SC0000989 awarded by the Department of Energy. The United States government has certain rights to this invention.

INCORPORATION BY REFERENCE

All patents, patent applications and publications cited herein are hereby incorporated by reference in their entirety in order to more fully describe the state of the art as known to those skilled therein as of the date of the invention described herein.

BACKGROUND

Actuators have come a long way since the invention of rotary motors, which set the foundation for robotics and marks the dawn of the age of automation and industrialization. The drastic improvement in performance of hard actuators nowadays is only matched by the large number of emerging soft actuators, which demonstrate functionalities tantamount to or more expansive than that of their hard counterparts. The most common mode of hard actuation-torsion, however, has very few realizations in soft actuator designs.

Robots or machines capable of complex movements often require many actuators working in synchrony. Such systems are potentially difficult to control. One way of reducing the complexity in control is to have parallel actuation in the system, where one or a few inputs can result in many outputs working synchronously in a desired way. For hard machines, parallel actuation can be realized through gears and levers in high precision. In soft machines, however, the counter parts of such parallel actuation systems are rare or non-existent.

SUMMARY

A new class of soft actuators that use buckling as a mechanism for actuation and methods of using the same for actuation are provided. In one aspect, a rotation center having a center of mass; a plurality of bucklable, elastic structural components each comprising a wall defining an axis along its longest dimension, the wall connected to the rotation center in a way that the axis is offset from the center of mass in a predetermined direction; and a plurality of cells each disposed between two adjacent bucklable, elastic structural components and configured for connection with a fluid inflation or deflation source; wherein upon the deflation of the cell, the bucklable, elastic structural components are configured to buckle in the predetermined direction. The shape of the cell is in principle not restricted and any shape or size of the cell is contemplated.

The soft actuator as described herein has excellent scaling capabilities, allowing easy realization of parallel actuation, e.g., using a single input or multiple inputs such as the input of pressure or vacuum to enable multiple outputs to generate synchronous movements. Thus, the soft actuator or actuating device comprising a plurality of the soft actuators can trigger multiple actuations occurring in parallel.

In certain embodiments, soft actuators that are pneumatically powered as described herein can be easily fabricated and may provide delicate object-handling capabilities and enable sophisticated movement with the simple input of pressure. In certain embodiments, the soft buckling actuator generates forces, e.g., torque or rotational forces, as fluid is pumped in and out of the actuator's cell(s). The forces generated by the soft actuator may enable the development of robotic elements (e.g., robotic swimmers, grippers, or walkers) and synchronized parallel actuation of attached objects (e.g., puzzle pieces or focus tracking mirror array).

As used herein, "soft actuator" refers to an actuator with at least one portion of its body being soft. As used herein, "soft body" refers to the body of the soft actuator or a portion of the soft actuator that is soft and may be involved in the actuation movement of the soft actuator. However, the soft actuator or soft body, as used herein, may have one or more portions of its body being hard or may be connected with a hard body part.

In one aspect, a soft actuator is described, a soft actuator is described, including:

- a rotation center having a center of mass;
- plurality of bucklable, elastic structural components each comprising a wall defining an axis along its longest dimension, the wallconnected to the rotation center in a way that the axis is offset from the center of mass in a predetermined direction; and
- a plurality of cells each disposed between two adjacent bucklable, elastic structural components and configured for connection with a fluid inflation or deflation source;
- wherein
- upon the deflation of the cell, the bucklable, elastic structural components are configured to buckle in the predetermined direction.

In any one of embodiments described herein, all of the bucklable, elastic structural components are configured to bend clockwise.

In any one of embodiments described herein, all of the bucklable, elastic structural components are configured to bend counter-clockwise.

In any one of embodiments described herein, the two or more bucklable, elastic structural components are located symmetrically around the rotation center.

In any one of embodiments described herein, the soft actuator comprises 3, 4, 5, 6, 7, 8, or more bucklable, elastic structural components.

In any one of embodiments described herein, the wall defines the wall of the cells.

In any one of embodiments described herein, the bucklable, elastic structural component is configured to buckle upon the deflation of the cell and return to its original position when the deflated cell is re-inflated.

In any one of embodiments described herein, the soft actuator further includes two or more secondary structural components structurally linked to the cell, wherein the secondary structural component is stiffer than the bucklable, elastic structural component and configured not to buckle before the bucklable, elastic structural component upon the deflation of the cell.

In any one of embodiments described herein, the bucklable, elastic structural component and the secondary structural component are two of the walls of the cell.

In any one of embodiments described herein, the bucklable, elastic structural component is in the form of a pillar, level, beam or in an arc shape, a star sharp, or a diamond shape.

In any one of embodiments described herein, the cell is in the shape of a rod, sphere, slit, triangular prisms, square prisms, or cylinder.

In any one of embodiments described herein, the soft actuator comprises two or more cells connected to each other and configured for connection to the fluid inflation or deflation source but are otherwise isolated from the outside atmosphere.

In any one of embodiments described herein, the cell is connected to a fluid chamber configured for connection with the fluid inflation or deflation source.

In any one of embodiments described herein, the soft actuator includes two or more cells configured for connection with the same fluid inflation or deflation source.

In any one of embodiments described herein, the soft actuator comprises two or more cells and at least two of the cells are connected to different fluid inflation or deflation sources.

In any one of embodiments described herein, the soft actuator further includes fluid inflation or deflation source, wherein the source is a gas pump, a gas vacuum, or a gas pump and vacuum.

In any one of embodiments described herein, the soft actuator further comprises a hard body portion.

In any one of embodiments described herein, the soft actuator is a robotic grabber, a robotic walker, or a robotic swimmer.

In another aspect, an actuating device comprising a combination of two or more soft actuators each according to any one of the embodiments disclosed herein is described.

In any one of embodiments described herein, each of the soft actuator is configured for connection with the same fluid or vacuum source or at least two of the soft actuators are configured for connection with different fluid or vacuum sources capable of being activated independently.

In any one of embodiments described herein, the actuating device is an actuating array and each of the soft actuator is configured for connection with the same fluid or vacuum source.

In yet another aspect, a method of actuation is described, including:

providing the soft actuator of any one of embodiments disclosed herein; and deflating the cells or over-inflating the cells to cause the bucklable, elastic structural components to buckle and the rotation center to rotate.

In yet another aspect, a method of actuation is described, including:

providing the actuating device of any one of embodiments disclosed herein; and deflating the cells or over-inflating the cells of the plurality of the soft actuators to cause the bucklable, elastic structural components to buckle and the rotation centers to rotate.

In any one of embodiments described herein, the cells of the plurality of the soft actuators are deflated or over-inflated simultaneously or independently.

It is contemplated that any embodiment disclosed herein may be properly combined with any other embodiment disclosed herein. The combination of any two or more embodiments disclosed herein is expressly contemplated.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments. Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly. Further still, in this disclosure, when an element is referred to as being "linked to," "on," "connected to," "coupled to," "in contact with," etc., another element, it may be directly linked to, on, connected to, coupled to, or in contact with the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

DESCRIPTION OF THE DRAWINGS

The invention is described with reference to the following figures, which are presented for the purpose of illustration only and are not intended to be limiting. In the Drawings:

FIG. 1C) illustrates a pentagonal rotator; and FIG. 1D) illustrates a hexagonal rotator.

In FIG. 4A), the claws of the buckling grabber close with the buckling motion according to one or more embodiments described herein. In FIG. 4B), a time-lapsed photograph series shows the buckling grabber grabbing a piece of chalk according to one or more embodiments described herein. In FIG. 4C), a timelapsed photograph series shows the buckling grabber grabbing a toy elephant according to one or more embodiments described herein. FIG. 4D) a timelapsed photograph series shows the buckling grabber grabbing a 20 g weight, according to one or more embodiments described herein. Scale bars are 2 cm long.

FIG. 5A) illustrates a time-lapsed photograph series showing a soft robotic swimmer according to one or more embodiments described herein. FIG. 5B) illustrates a time-lapsed photograph series showing a soft robotic walker according to one or more embodiments described herein. Scale bars are 2 cm long.

DETAILED DESCRIPTION

Figure 1A:
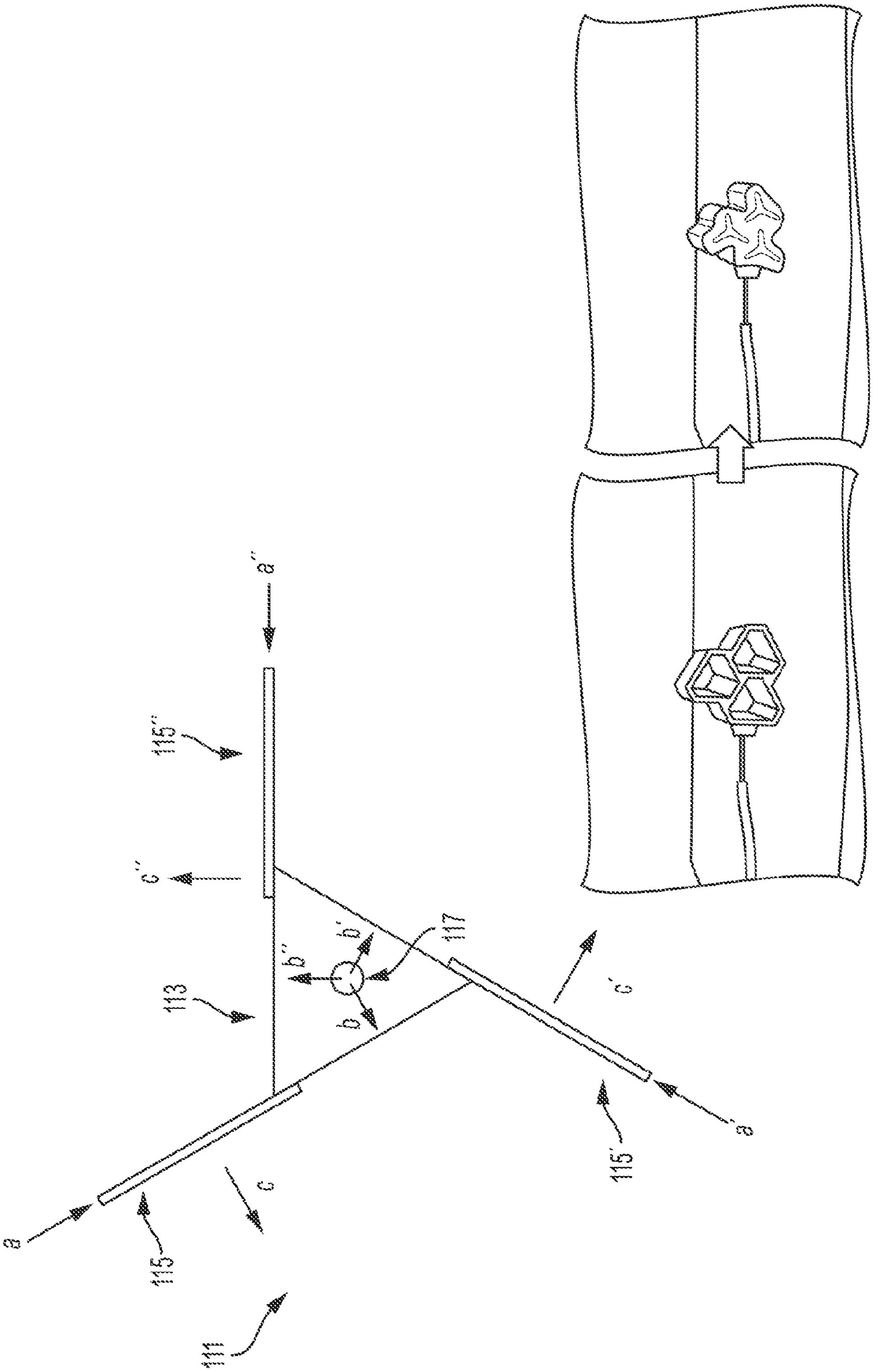
FIGS. 1A-1D illustrate various buckling actuating rotators according to one or more embodiments described herein. Specifically, FIG. 1A) illustrates a triangular rotator; FIG. B) illustrates a square rotator.

In one aspect, a soft actuator is described, including: a rotation center having a center of mass; a plurality of bucklable, elastic structural components each comprising a wall defining an axis along its longest dimension, the wall connected to the rotation center in a way that the axis is offset from the center of mass in a predetermined direction; and a plurality of cells each disposed between two adjacent bucklable, elastic structural components and configured for connection with a fluid inflation or deflation source; wherein upon the deflation of the cell, the bucklable, elastic structural components are configured to buckle in the predetermined direction. In other embodiments, all of the axes of the bucklable, elastic structural components are configured to bend counter-clockwise.

As used herein, "structurally linked" refers to the scenario in which two structural components are connected directly or indirectly through an additional structural components. As a result, the movement of one of the two structurally linked components will result in the movement of the other component.

As used herein, the term "buckle" refers to the phenomenon in which a structural component of the soft actuator bends, crumples or collapses, in response to a compressive or tensile force on this component. In some cases "buckling" occurs when the cell of the soft actuator is deflated, as deflation (but not limited to) of structures lead to overall or local compression and compressive forces. In other instances "buckling" occurs when the cell of the soft actuator is inflated, as inflation of the structures leads to overall or local tension and tensile forces. Thus, the bucklable, elastic structural component is an elastic structural component of the soft actuator that bends or collapses when the cell of the soft actuator is deflated or unbend when the cell is inflated under a compressive or tensile force applied across the bucklable structural element, it will buckle (it may resist a compression and maintain its shape to some extent before buckling).

The soft actuator body contains one or more cells inside the soft body. As used herein, the term "cell" refers to an enclosed space within the soft body of the soft actuator which is configured for connection with an external fluid inflation and/or deflation source. In some embodiments, the cell is in the form of a rod, slit, triangular prisms, square prisms, cylinder or an oval cross-section shape. However, the cell can have any other form or shape. In certain embodiments, other than the connection with an external fluid inflation and/or deflation source, the cell is isolated from the outside atmosphere. In certain embodiments, two or more cells are connected to each other. The soft body or portions thereof define the boundaries, e.g., walls, of the cell. In certain embodiments, the bucklable, elastic structural component makes up at least one of the boundaries, e.g., walls, of the cell. In certain embodiments, the bucklable, elastic structural component and the secondary structural component (described further below) make up two or more boundaries, e.g., walls, of the cell.

When the cell collapses during deflation or expands during re-inflation, the bucklable, elastic structural component is subjected to forces as a result of the cell's collapse or expansion and therefore buckles. In certain embodiments, this buckling results in a change in the shape and/or size of the soft actuator's body and generates a force, e.g., torque or rotational forces, which can be utilized for actuation. The expansion or compression forces as a result of the cell inflation or deflation do not act uniformly over the entire soft body in that some areas of the soft body will deform more than other areas. This will generate a non-uniform response from the soft body which causes one region and not another to collapse or buckle (or one region to deform to a greater extent than another regions) and gives rise to the rotational movement. Therefore, as described herein, buckling of the bucklable, elastic structural component can be used as a mechanism for actuation.

In some embodiments, a soft actuator is described, including: a soft body defining one or more cells inside the soft body each configured for connection with a fluid inflation or deflation source; a rotation center within the soft body; and two or more bucklable, elastic structural components within the soft body and structurally linked to the rotation center and configured to buckle upon the deflation or inflation of the cell to generate a force to cause the rotation center to rotate. In these embodiments, upon the deflation or inflation of the cell, the bucklable, elastic structural component deforms as a result of the positive or negative pressure exerted on it by the cell's changed shape. The deformation, i.e., buckling, of the bucklable, elastic structural component forces the rotation center to rotate.

Figures 1B, 1C, 1D:
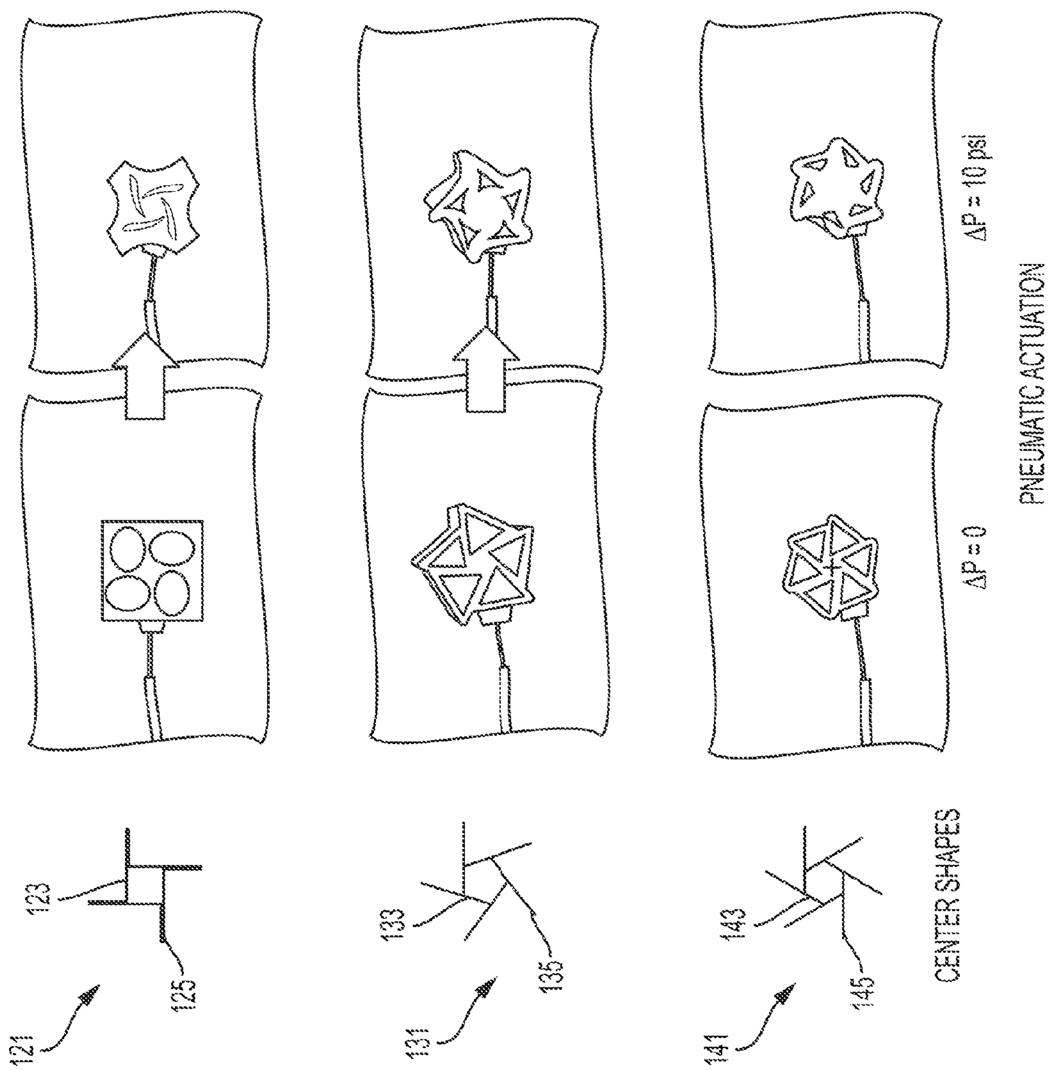

In certain embodiments, the rotating soft actuator can be described with reference to FIGS. 1A)-1D). Shown in the left of FIGS. 1A)-1D) are schematics of triangular rotator 111 (FIG. 1A)), square rotator 121 (FIG. 1B)), pentagonal rotator 131 (FIG. 1C)), and hexagonal rotator 141 (FIG. 1D)). Each of the rotators has a rotation center (i.e., 113 in FIG. 1A), 123 in FIG. 1B), 133 in FIG. 1C), and 143 in FIG. 1D). As shown in the FIG. 1A), three bucklable, elastic structural components, walls 115, 115', and 115", are connected to the rotation center 113. The rotation center 113 has a center of mass 117, which represents the center of the mass of 113. Wall 115 has an axis, indicated by arrow a, along its longest dimension. Wall 115 is connected to the rotation center 113 and its axis a is offset from the center of mass 117 in the direction indicated by arrow b. Similarly, Wall 115' is connected to the rotation center 113 and its axis a' is offset from the center of mass 117 in the direction indicated by arrow b'. Still similarly, Wall 115" is connected to the rotation center 113 and its axis a" is offset from the center of mass 117 in the direction indicated by arrow b". Thus, the triangular rotation has a built-in structural bias: the component 115 will buckle away from the rotation center 113 (i.e., in the direction of c), not against it (similarly, 115' and 115" will buckle in the direction of c' and c", respectively). Thus, all of 115, 115', and 115" will buckle in the counter-clockwise direction and as a whole the rotator 111 will rotate counter clockwise (as shown in the right hand side of FIG. 1A, wherein the walls are highlighted by black lines). Similarly, in FIG. 1B, the square rotator 121 has four bucklable, elastic structural components 125 each having a wall defining an axis along it longest dimension which offsets the center of mass in the same direction (the right of the mass center). In FIG. 1C, the pentagonal rotator 131 has five bucklable, elastic structural components 135 each having a wall defining an axis along it longest dimension which offsets the center of mass in the same direction (the right of the mass center). In FIG. 1D, the hexagonal rotator 141 has six bucklable, elastic structural components 145 each having a wall defining an axis along it longest dimension which offsets the center of mass in the same direction (the right of the mass center). As a result, all of the rotators in FIGS. 1A)-1D) will rotate counter-clockwise with vacuum deflation of the cells ($\Delta P$=10 psi). As the Figures show, the cells collapse under vacuum, which renders the pillars to buckle and as a result, the center of the rotation rotates.

Figure 1E:
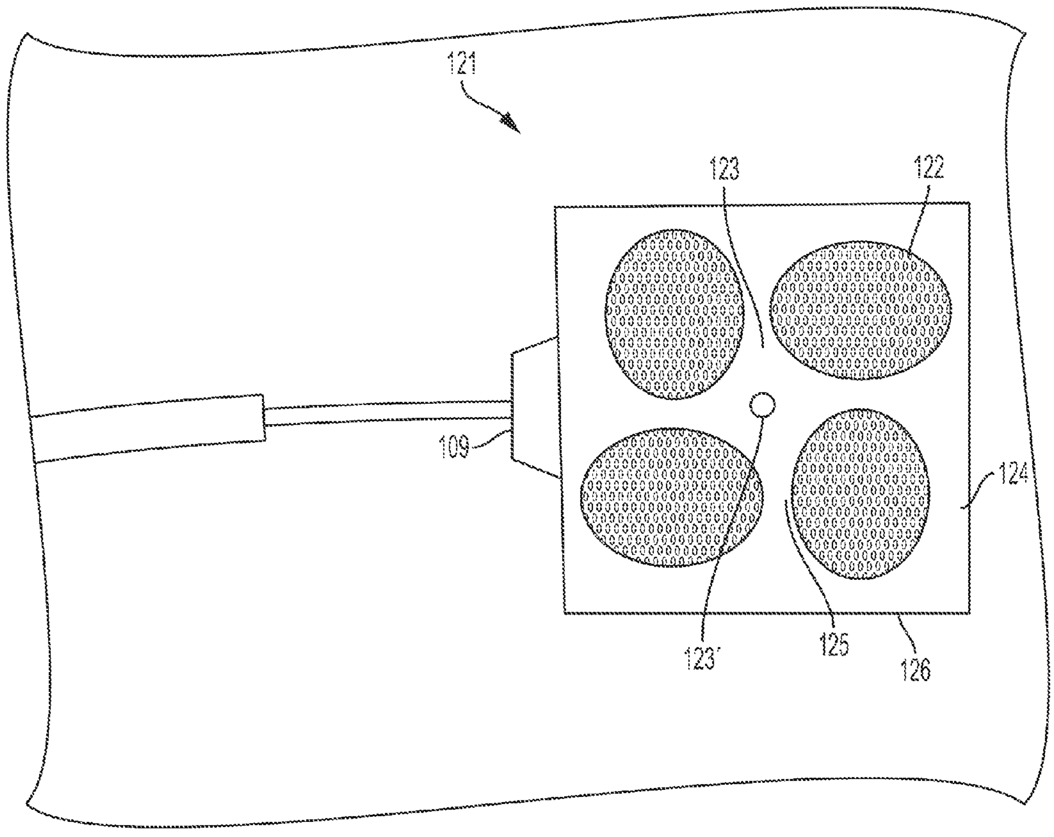
FIG. 1E) illustrates the structural components of a square rotator according to one or more embodiments described herein.
Figure 1F:
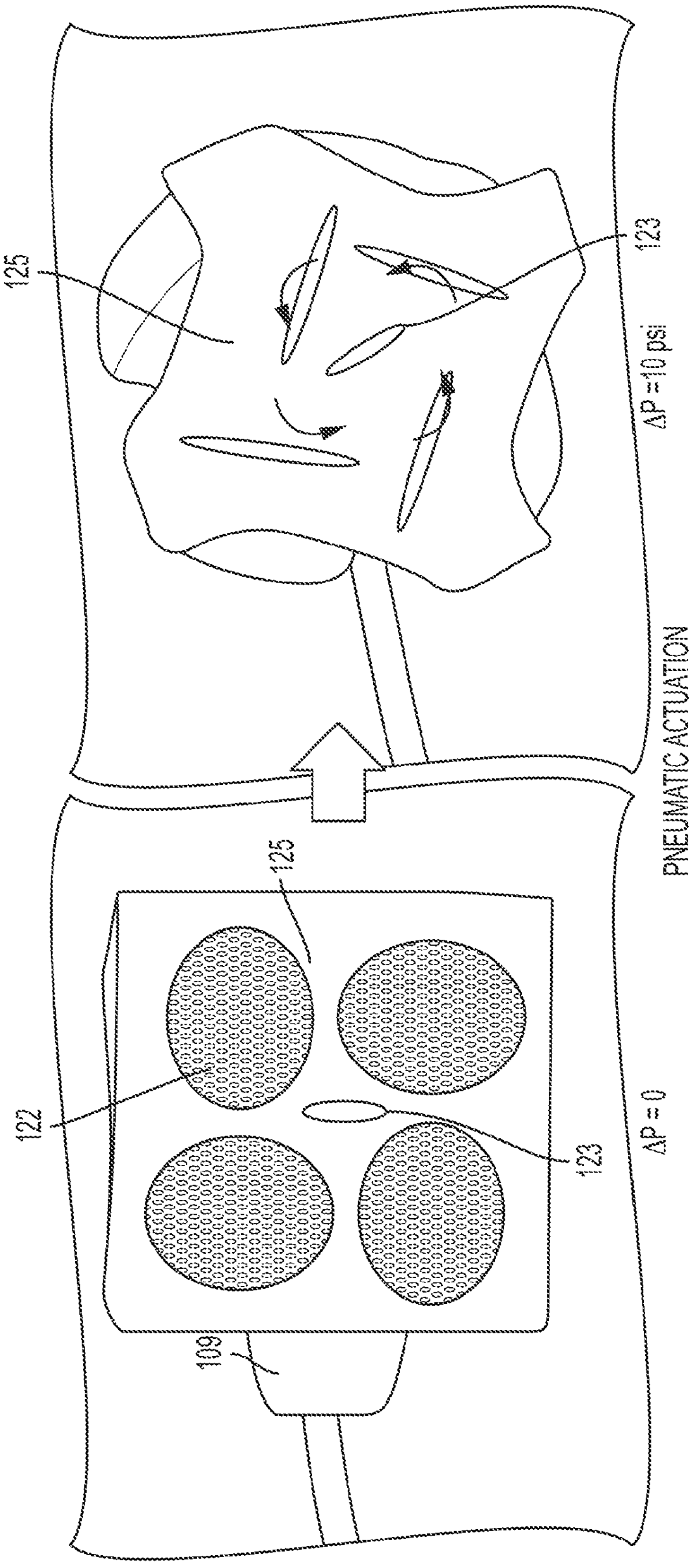
FIG. 1F) illustrates the actuation of the square rotator in FIG. 1E) according to one or more embodiments described herein.

An enlarged view of the square rotator is shown in FIG. 1E) and 1F). As shown in FIG. 1E), a soft actuator 121 contains a number of cells 122. The actuator is a molded body that includes, as integral components, a number of structural elements that react differently to depressurization. The soft body includes bucklable, elastic structural components 125 and secondary structural components 124. The bucklable, elastic structural components 125 and secondary structural components 124, along with another secondary structural component 126, together form the walls of cells 122 of the actuator. The bucklable, elastic structural components 125 has an axis along its longest dimension which is offset from the center of mass in a first direction, i.e., pass through to the right of the center of mass 123' of the rotation center 123. Thus, upon actuation, cell 122 is deflated and component 125 buckles counter-clockwise (FIG. 1F), so that the rotation center 123 rotates counter-clockwise. As shown in the FIGS. 1E and 1F, the cells are connected to a fluid chamber 109 which is connected with a fluid deflation source. In this particular embodiment shown in FIGS. 1E) and 1F), there are four bucklable, elastic structural components 125 symmetrically located around the rotation center 123, which approximates a rod having a square cross-section, and each of the four bucklable, elastic structural components 125 forms a side of the square. See, e.g., the schematic illustration in FIG. 1(B). The bucklable, elastic structural components also make up one of the walls defining cells 122.

While the structural components shown in FIG. 1A-1F, are directly connected, the elements can be structurally linked through intermediate structures. In some embodiments, the bucklable, elastic structural components are spaced about the rotation center. The soft actuator includes at least two, but can include 3, 4, 5, 6, 7, 8, or more bucklable, elastic structural components, spaced about the rotation center. The bucklable, elastic structural components can be located symmetrically around, e.g., evenly spaced about, the rotation center.

As shown in FIG. 1(E), the cells in the shape of an ovoid cylinder, having an elliptical cross-section; however, the cell can be a variety of shapes, including in the shape of a rod, sphere, slit, triangular prisms, square prisms, or cylinder. The aspect ratio of the cell may also contribute to the predetermined actuation pattern.

The bucklable, elastic structural component can be in any form or shape. In some specific embodiments, the bucklable, elastic structural component is in the form of a pillar, beam, or column. In certain embodiments, the bucklable, elastic structural component has a high aspect ratio and is in the form of a pillar, a level, a beam, or is a wall of a cell or part thereof. In certain embodiments, those pillars/levers/beams that buckle have higher aspect ratio than those that maintain their shapes, thanks to Euler's buckling formula. For example, any shape that has two ends to which a compressive force can be applied and possibly collapse the structure, such as: an arc shape, a star shape (pick any two ends), a diamond shape with a hole in the middle, etc.

In some embodiments, the bucklable, elastic structural component has a high aspect ratio. As used herein, aspect ratio refers to the ratios of the long dimension to the short dimension of an object or particles. An aspect ratio of more than one is generally referred to as high aspect ratios. In certain embodiments, the bucklable, elastic structure component has an aspect ratio of more than 1:1, 2:1, 3:1, 4:1, 5:1, 10:1, or 20:1, or in the range denoted by any two values described herein. Other suitable high aspect ratios are contemplated. In certain embodiments, the bucklable, elastic structure component with a high aspect ratio may buckle in the direction perpendicular to its long dimension.

In certain embodiments, the bucklable, elastic structural component is directly neighboring or adjacent to the cell. Thus, when the cell collapses or over-inflates, as a result of pressure, the bucklable, elastic structural component buckles and generates a force (e.g., a torsional or rotational force) for actuation. In one particular embodiment, the bucklable, elastic structural component(s) surround the cell.

In certain embodiments, the bucklable, elastic structural component neighbors the cell, (e.g., the bucklable, elastic structural component is one of the walls of the cell), or the bucklable, elastic structural component is connected to one or more intermediate structural elements which are directly neighboring or adjacent to the cell. The intermediate structural element may be made from a material which is not bucklable or less bucklable than the bucklable, elastic structural component. Alternatively, the additional structural element can be thicker and/or shorter than the bucklable, elastic structural component and thus will not buckle or will not buckle first. Alternatively, the additional structural element can be positioned so that no substantial anisotropic compressive force is applied under contraction of cells (such as a rotation center: although it's subject to compression, the compression comes evenly from all directions, thus unable to buckle the center)

The soft actuator includes one or more secondary structural components structurally linked to the cell. As noted above, the secondary structural component does not buckle upon the deflation or inflation of the cell, or is designed not to buckle first. The secondary structural component can be directly neighboring or adjacent to the cell or connected to one or more intermediate structural elements which are directly neighboring or adjacent to the cell. In certain embodiments, the secondary structural component does not buckle when the bucklable, elastic structural component buckles as a result of the deflation or over-inflation of the cell. In certain embodiments, the secondary structural component is made from a non-elastic material or a material that is less elastic than the material of the bucklable, elastic structural component. In other embodiments, the secondary structural component is made from a material the same as or similar to the material of the bucklable, elastic structural component but is thicker and/or shorter and thus is more resistant to pressure. As a result, when the cell is deflated or re-inflated, the secondary structural component does not buckle and the bucklable, elastic structural component buckles to generate a force for actuation. The secondary structural component can be in any form or shape, e.g., a pillar, a column, a disk, a sphere, a cube, a prism, or any polyhedron or smooth 3D shape in general.

The rotating portion of the soft actuator's body can be any part of the soft actuator. Other configurations for the cell, the rotating portion of the soft actuator's body, and the bucklable, elastic structural component are contemplated.

Buckling of materials is often considered an undesired behavior as it often results in permanent altered states of the materials that degrade their original functions. The reversible buckling of elastomeric materials as described herein, however, is free of such problems, and enables the development of a new class of actuators that utilize buckling for actuations as described herein. Thus, in some embodiments, the bucklable, elastic structural component buckles upon the deflation of the cell and returns to its un-buckled state upon re-inflation of the cell. In other embodiments, the bucklable, elastic structural component is configured to buckle upon the over-inflation of the cell which generates a pressure above the atmosphere pressure and returns to its original position/state when the over-inflated cell is deflated.

As described herein, the aspect ratio of the cell may also contribute to the predetermined actuation pattern. A non-limiting example is described earlier and in FIGS. 1*e*) and 1*f*), where the cell has an eclipse shape and thus the cell will collapse along its shorter axis when the cell is deflated.

In some embodiments, all structural elements may be made from one or more elastomers. Any elastomer known in the art may be used. In some embodiments, some structural elements may be made from hard materials. Any known elastic material can be used to make the bucklable, elastic structural component. In some embodiments, the material for making the bucklable, elastic structural component is an elastic polymer. Any elastic polymer known in the art can be used. Non-limiting examples of the elastic polymer include natural rubber, silicone rubbers, polyurethane rubbers, isoprene rubber, butadiene rubber, butyl rubber, styrene-butadiene rubber, nitrile rubber, ethylene propylene rubber, epichlorohydrin rubber, polyacrylic rubber, fluorosilicone Rubber, fluoroelastomers, perfluoroelastomers, polyether block amides, chlorosulfonated polyethylene, ethylene-vinyl acetate, thermoplastic elastomers, proteins resilin and elastin, polysulfide rubber, elastolefin, etc. In some embodiments, the material to make the bucklable, elastic structural component is Ecoflex, Elastosil, PDMS, 3D printed soft materials, or another material that is elastic and air tight. Any rigid materials known in the art may be used, as long as they can establish mechanical connection with the soft material used.

In some embodiments, the soft actuator comprises more than one cell connected to each other and to the optionally external fluid inflation or deflation source but otherwise isolated from the outside atmosphere. In certain embodiments, the cells are connected to the same optionally external fluid inflation or deflation source. In other embodiments, the cells are connected to different optionally external fluid inflation or deflation source and can be inflated or deflated (and thus actuated) independent of each other. Thus, the cells can be separate from one another, providing more degrees of freedom of actuation. For example, in certain specific embodiments, two buckling actuators (each with connected cells) can be glued (e.g., with elastomer) side to side, center to center, or any other ways of physical attachments, thus providing two actuating units separately-controllable.

The fluid inflation or deflation source, which is optionally external to the soft actuator, can be any apparatus that inflates and/or deflates the fluid. Non-limiting example of the fluid inflation or deflation sources include a gas pump, a gas vacuum, a gas pump and vacuum, a liquid pump, a liquid-suction pump, or a liquid pump and suction pump. In some embodiments, the one or more cells are connected directly to the fluid inflation/deflation source or via a fluid chamber. The use of any fluid, gas or liquid, is contemplated, including air, gas, water, oil, liquid metal. A non-limiting example of the gas is air. In some specific embodiments, the one or more cells are connected to a gas chamber, which may be connected to the gas inflation/deflation source. In other embodiments, the cell is connected to the gas inflation/deflation source directly. The use of other gases is contemplated.

In certain embodiments, the fluid is gas and the fluid inflation/deflation source is an optional external gas inflation/vacuum source. The external gas inflation source may be a pump, gas cylinder or balloon. The external vacuum source may be a vacuum pump. Any other gas inflation source and vacuum source known in the art are contemplated.

Thus, in some embodiments, an external deflation source, e.g., vacuum source, is used to induce a negative pressure within the cell, which allows the atmospheric pressure to apply an isotropic compressive force. Pneumatic actuation using air has the additional advantages, e.g., that the air it uses is widely available, safe to operate, transfers quickly through tubing (due to its low viscosity), lightweight, and easily controlled and monitored by regulators, valves, and sensors. In some embodiments, the cells are sealed so that it is topologically closed except for the entrance into the inflation/deflation device or the common air chamber. By connecting the cells and attaching a gas channel, e.g., a tube, to the inflation/deflation device, the cells inside the soft actuator body can be inflated and deflated through pumping air and applying vacuum. In other embodiments, an external inflation source may be used to induce a positive pressure within the cell (a gas cylinder which pumps gas into a cell), which allows the cell to expand to generate a force to cause the bucklable, elastic structural component to un-buckle (pressure reverses motion).

In another aspect, an actuating device comprising a combination of any two or more the soft actuators of any one of the embodiments described herein is described. The soft actuators can be connected to the same external fluid or vacuum source, or at least two of the soft actuators are connected to different external fluid or vacuum sources capable of being activated independently. As a result, parallel or independent actuation is achieved.

In certain embodiments, the soft actuator or actuating device is a robotic grabber, walker, or swimmer, as described herein. In certain embodiments, the soft actuator or actuating device is a puzzle actuator or a focus tracking mirror array, as described herein.

Actuating Rotator

The shapes of the cells, e.g., holes, are in principle not restricted. In a particular embodiment, ellipse-shaped cells that alternate its orientation in lattice by 90 degrees or about 90 degrees (e.g., from 80-90, 85-90, 85, 86, 87, 88, 89 or 90 degrees) are used. This design restricts the actuator to rotation in a certain direction, instead of allowing it to rotate in both directions. For instance, the cells 122 in the square rotator 121 are designed to be oval-shaped so that the buckling may occurs preferentially along the shorter axis of the oval.

Planar crystal structures with different rotational symmetries have been studied by chemists. In certain embodiments, the actuating rotators with rotational symmetry are designed based on a variety of crystal geometries. In other embodiments, the actuating rotators are combined into arrays to realize parallel actuation/rotation.

The performance parameters for the actuating rotators described herein can be characterized by the mechanical properties including: i) range of motion, ii) angle vs. pressure, iii) torque vs. pressure, and/or iv) change in volume vs. pressure. Described herein are several non-limiting examples of rotational buckling actuators (i.e., actuating rotators) that each provides different mechanical (i.e., range of motion, angle vs pressure, torque vs pressure, change in volume vs pressure) behaviors.

In certain embodiments, the rotating actuator comprises 3, 4, 5, 6, 7, 8, or more bucklable, elastic structural components, e.g., pillars. In certain embodiments, the bucklable, elastic structural components are positioned symmetrically around the rotation center.

In certain embodiments, a soft bodied actuator is provided having an array of holes in a flexible, e.g., rubber or elastomeric, structure. The arrays of holes that are extended in one dimension to form cylinders, columns or rods in the soft actuator demonstrate the interesting property of "organized buckling". When aligned in an array, the holes form rubber "pillars" that are surrounded by a number of holes, e.g., 4-6, holes when a biaxial compression is applied, the structure reduces its volume by collapsing the holes into slits through bending/buckling of the flexible walls between the holes. While doing so, the rubber "pillars" that are surrounded by holes rotate clockwise and counter-clockwise in an alternating pattern. Such motions provide the basic elements to construct torsional soft actuators or to realize parallel actuation.

The cells can have any desired geometry. In certain embodiments, the soft-bodied actuator includes holes having a round cross-section shape. In certain embodiments, the soft-bodied actuator includes holes having an ellipsoid cross-section. In certain embodiments, the ellipse shaped holes are arranged in alternating orientations, that is, the longer diameter of the ellipsoid cross section alternates between orientations. When the biaxial compression is applied on an array of cells, e.g., holes, in rubber with circular shaped holes, however, the holes are equally prone to collapse vertically and horizontally. Thus the material cannot decide whether to rotate left or right upon application of pressure. This bifurcation is undesirable for a reliable actuator design. In some embodiments, ellipse-shaped holes in alternation orientations are included in the soft actuator. Once under vacuum and compressed, the holes are predisposed to collapse along the short axis of the ellipse, thus eliminating the bifurcation.

A practical approach to biaxial decomposition is to induce a negative pressure within the structure, which allows the atmospheric pressure to apply an isotropic compressive force. Pneumatic actuation has the additional advantages in that the air it uses is widely available, safe to operate, transfers quickly through tubing (due to its low viscosity), lightweight, and easily controlled and monitored by regulators, valves, and sensors. Therefore, the holes are sealed at one end by adding an additional layer of rubber on top of the array of holes. The structure is now topologically closed except for the entrance into the common air chamber. By connecting the holes—now chambers—and attaching a tube to the common air chamber, the body can be inflated and deflated through pumping air and applying vacuum. This actuator buckles and un-buckles through control of the pressure of the air inlet.

Arrays of the Soft Actuators

In some embodiments, an array of the soft actuators is described, comprising a plurality of any of the soft actuators described herein. In certain embodiments, the array comprises a plurality of the actuating rotators described herein and the cell/pillars are arranged so that adjacent rotation centers can rotate in concert or against one another, or in a predetermined pattern.

Figure 3B:
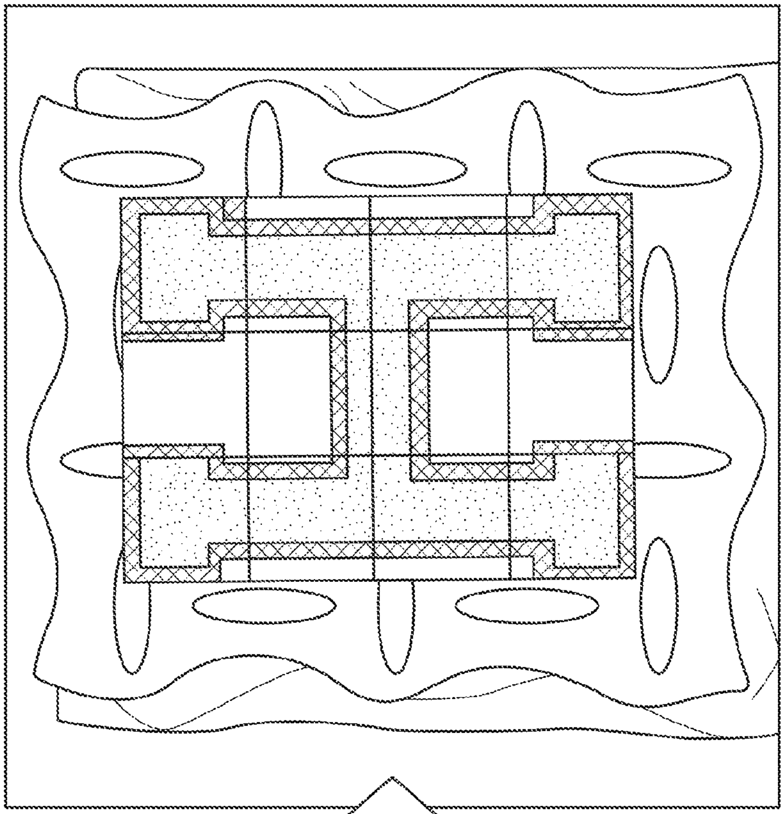
FIGS. 3A) and 3B) show an example of an array of buckling actuating rotators demonstrating parallel actuation, according to one or more embodiments described herein. Specifically, FIGS. 3A) and 3B) show the array of buckling actuating rotators in unactuated state and fully actuated state, respectively, according to one or more embodiments described herein.
Figure 3A:
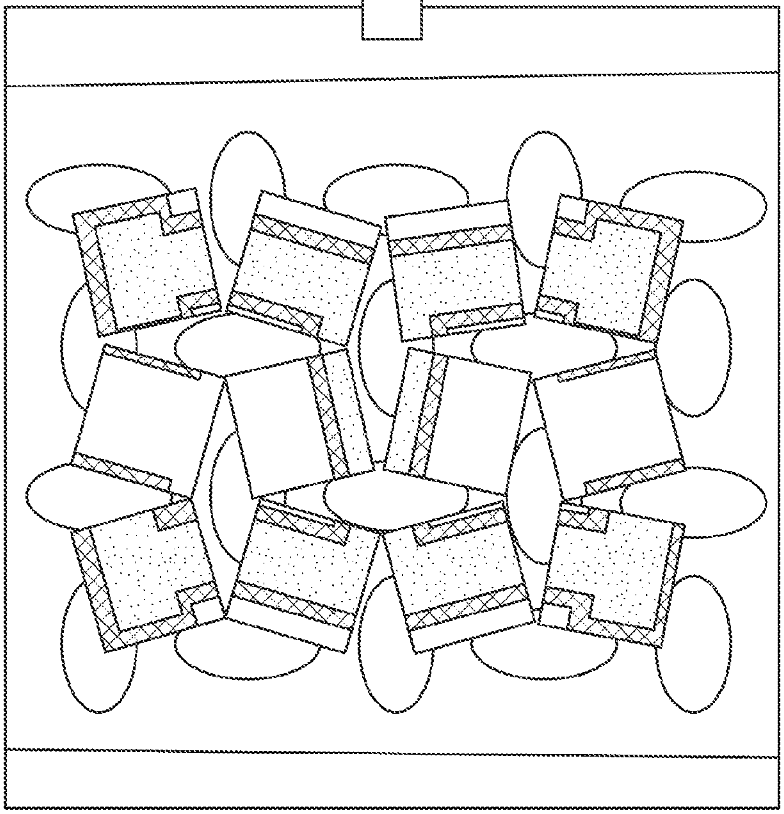

In some embodiments, an example of the rotating actuator array is described with reference to FIG. 3. The actuator array as shown contains multiple actuator working simultaneously. The actuator array contains puzzle pieces which are designed to move simultaneously in a concordant way from its unactuated state (shown in FIG. 3A)) to show the letter "H" in its fully actuated state (shown in FIG. 3B)). Scale bars are 1 cm long.

Transfer of Force from the Buckling Structure to Hard Elements

In certain embodiments, the soft actuator further includes a hard body portion. The soft buckling actuator can include both soft and hard components to perform useful functions.

Figure 4A:
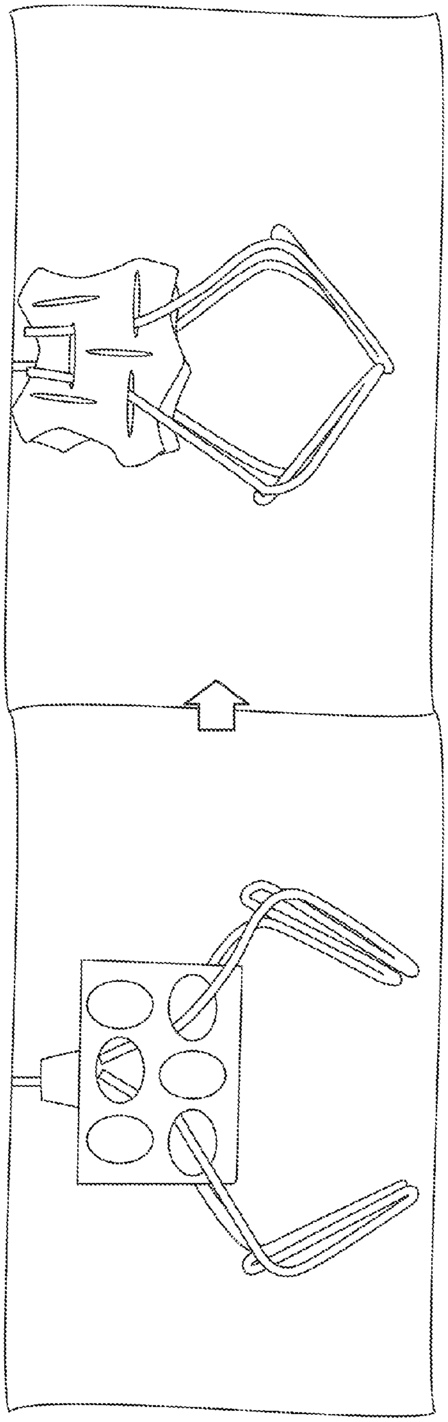
FIGS. 4A-4D show a soft actuating grabber using buckling actuating according to one or more embodiments described herein.
Figure 4B:
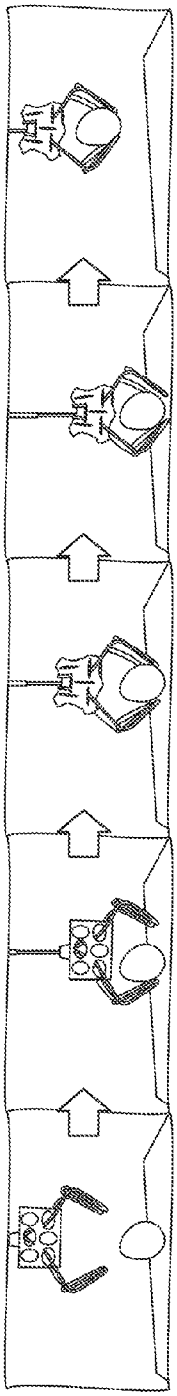
Figure 4C:
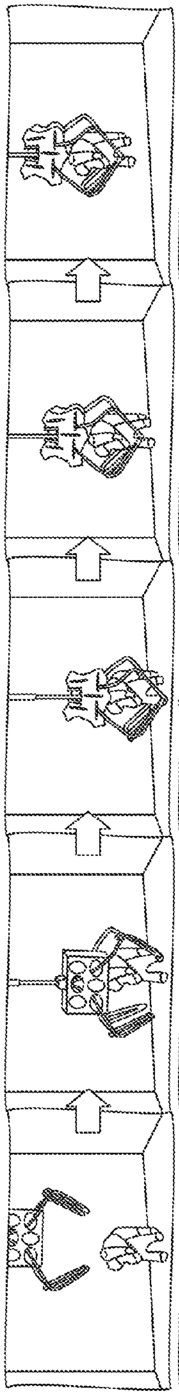
Figure 4D:
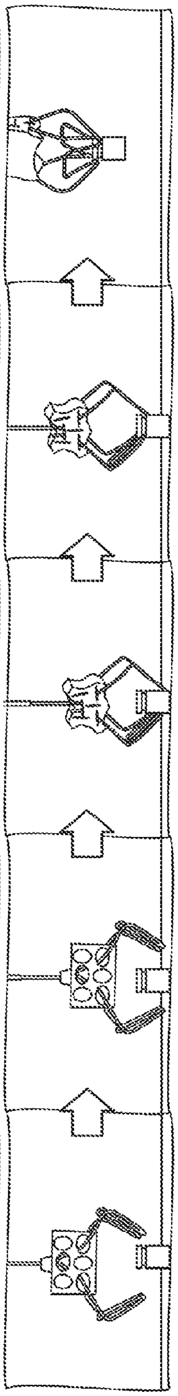

The soft buckling actuator is a promising new element one can use in making soft machines or soft and hard hybrid machines. FIGS. 4A-4D show a soft grabber made using a buckling actuator with tubing-sheathed steel wires. By attaching fingers (which is hard) to the rotating elements of the buckling actuator, the grabber can close or open its claw with the buckling motion (FIG. 4A). FIG. 4B shows that the buckling grabber is able to grab a piece of chalk. The grabber grabs the chalk through a buckling motion. In frame 4, the grabber is lowered to form a better grasp. Such dynamic adjustment of grasp gestures requires force feedback, which is difficult to realize in hard machines. This grabber however, is able to do so with very few inputs thanks to the structure built in. The grabber also is able to grab objects of complex shapes—a toy elephant and a standard weight—as shown in FIGS. 4C and 4D.

Implementation of Buckling Structures for Moving Machines

Figure 5A:
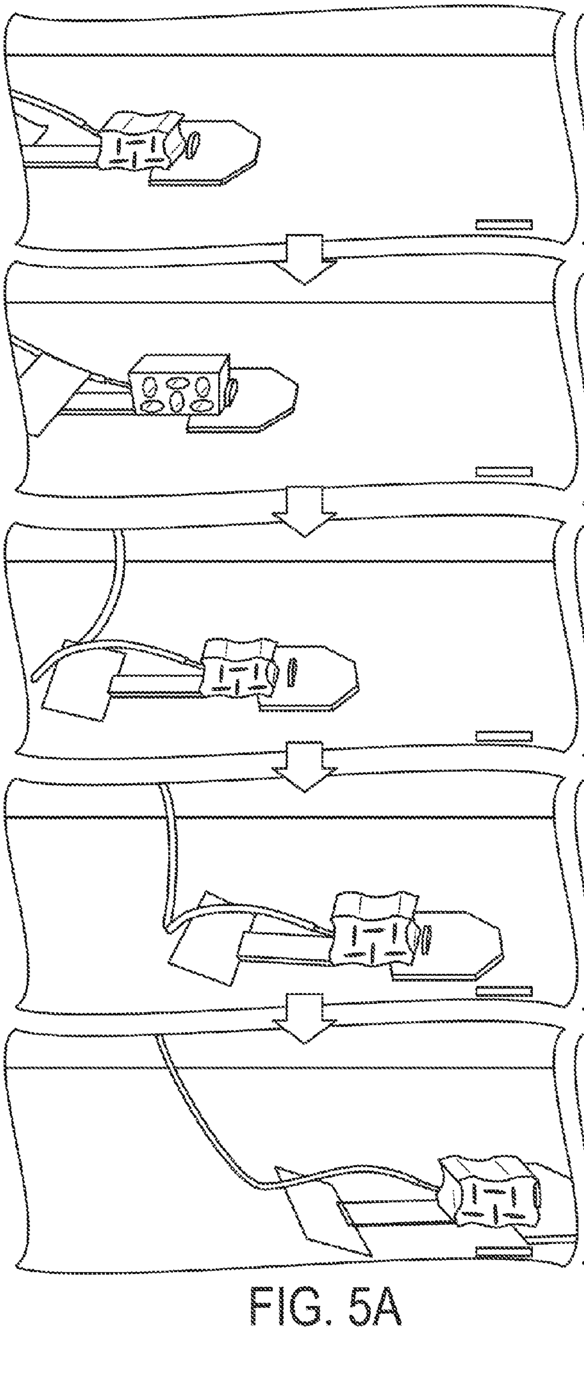
FIGS. 5A and 5B show soft robots with buckling actuators.
Figure 5B:
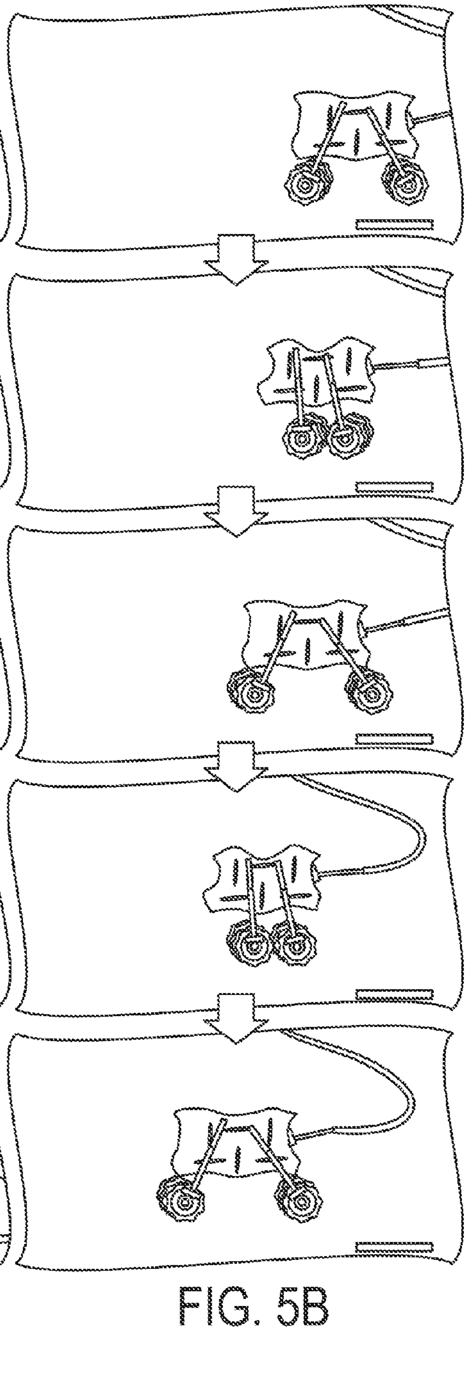

Soft machines have potential for use in locomotion since they are lightweight and able to adapt to their environment. FIGS. 5A and 5B show soft robots built with buckling actuators. A soft robotic swimmer (FIG. 5A) and a soft robotic walker (FIG. 5B) demonstrate the ability for motion. The swimmer swims forward due to an asymmetric design in the pedals, which can rotate freely backward, but not forward. Therefore the pedals extends in the power stroke, and folds in the return stroke—this is very similar to the swimming mechanism of a duck or a shrimp. The walker walks forward due to an asymmetric design in the feet, which functionally acts as ratchets.

Parallel Actuation of Buckling Structures

Figure 6A:
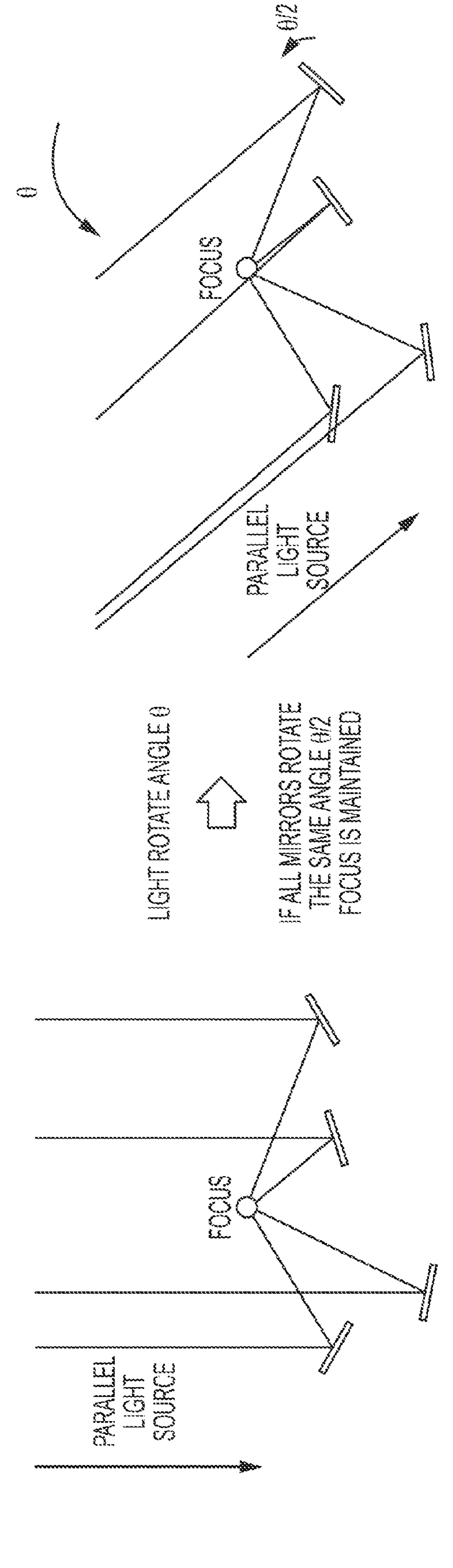
FIG. 6A) provides a schematic illustration of focus tracking mirror array according to one or more embodiments described herein.
Figure 6B:
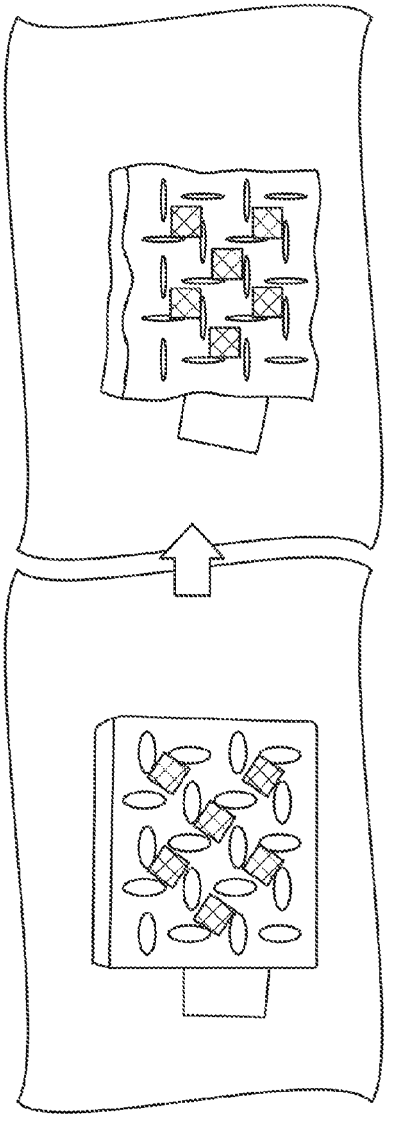
FIG. 6B) provides a focus tracking mirror array actuator in the resting (left) and actuated (right) states, according to one or more embodiments described herein.

Each unit in the buckling actuator is capable of individual torsional actuation; however that motion is simultaneous with and linked to the motion of the units in the array. Thus, multiple parallel actuations are possible. For example, each cell in a buckling array can be equipped with a reflecting surface (see schematics shown in FIG. 6A). On actuation, torsion will cause the reflective surface to rotate. FIG. 6A provides a schematic illustration of focus tracking mirror array using this concept. When the light changes its direction, the actuator is actuated to rotate for the same amount of degree of the light angle change (FIG. 6B). Thus, as a result, the focus of the mirror remains the same.

Fabrication of the Actuating Rotator

Figure 7:
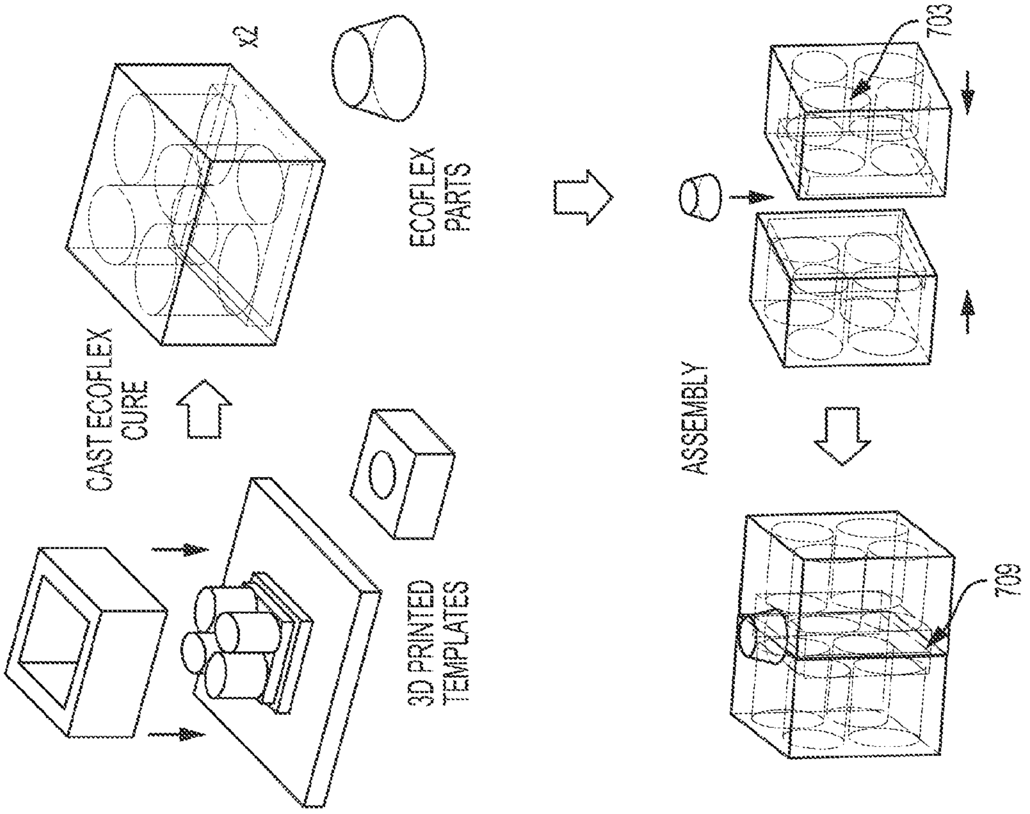
FIG. 7 illustrates the fabrication process of a square rotator according to one or more embodiments described herein.

In some embodiments, the soft buckling actuators, e.g., rotating actuators, are created by replica-molding (FIG. 7). The molds were designed by using computer-aided design (CAD) (Solidworks) and fabricated them using a 3D printer (StrataSys Fortus 400 mc). The molds, made of acrylonitrile butadiene styrene (ABS) plastic, and were filled with a silicone-based elastomer (Ecoflex 0030) for at least 3 hours at room temperature. The buckling actuators are casted as two halves and bonded together using uncured Ecoflex 0030 in a 60° C. oven for 10 minutes (FIG. 7). To interface with the actuator, a conically shaped elastomer piece is bonded to the side of the buckling actuator to provide additional material for tubing attachment (to apply vacuum). In these embodiments described in FIG. 7), all of the cells 703 are connected to a common air chamber 709. Accordingly, when the air chamber 709 is connected to an inflation/deflation source, e.g., external gas cylinder and vacuum pump, the cells may inflate/deflate, causing a rotational force available for actuation.

Scalability of the Soft Actuator

Figure 2A:
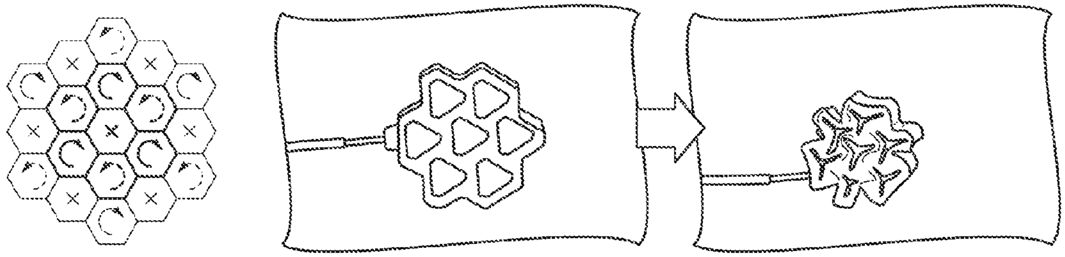
FIGS. 2A)-2C) illustrate parallel actuation and patterning of buckling actuating rotators according to one or more embodiments described herein. Specifically, FIG. 2A) is a schematic illustration of an array of triangular rotators, where arrows indicate the direction of actuation on depressurization (left) and a photograph of a triangular array actuator in the resting and actuation states (right) according to one or more embodiments described herein.
Figure 2B:
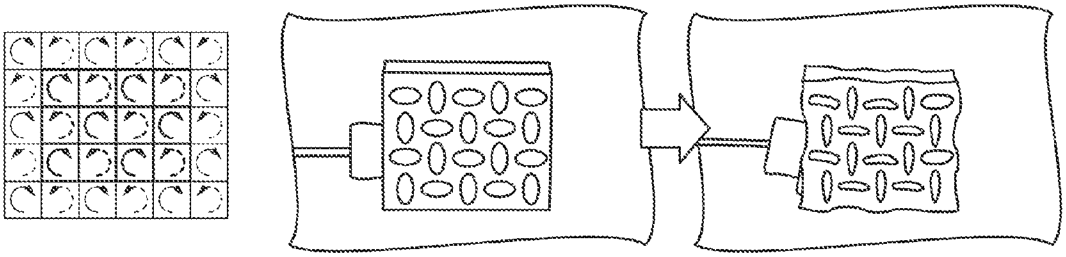
FIG. 2B) is a schematic illustration of an array of square rotators, where arrows indicate the direction of actuation on depressurization (left) and t a photograph of a square array actuator in the resting and actuation states (right) according to one or more embodiments described herein.
Figure 2C:
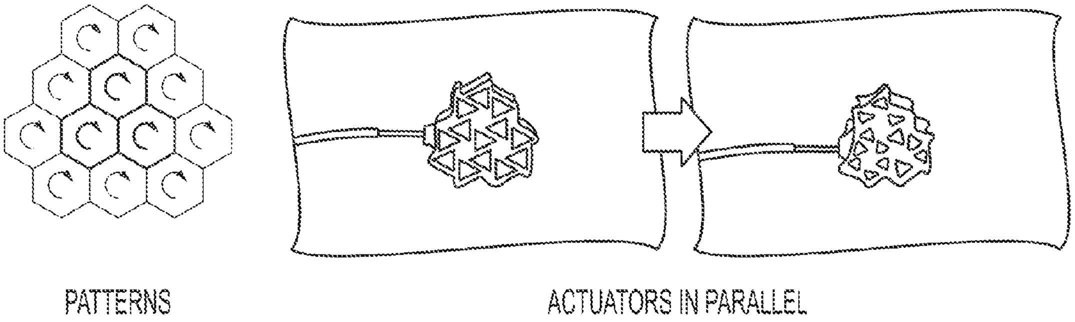
FIG. 2C) is a schematic illustration of an array of hexagonal rotators, where arrows indicate the direction of actuation on depressurization (left) and a photograph of a hexagonal array actuator in the resting and actuation states (right) according to one or more embodiments described herein.

Inspired by various crystallographic space groups, we built structures consisting of more than one output. FIGS. 2A-2C shows that triangular, square, and hexagonal rotators can be extended to arrays in accordance to P3, P4, and P6 space group respectively. The extended arrays are made via extending the pillar/center networks of the triangular, square, and hexagonal rotator, while connecting all cells to a single vacuum/pressure source. The single vacuum/pressure source distributes pressure evenly on all sub-units of this network, thus inducing identical degrees of deformation, in this case rotation, to all actuator centers. The centers are thus able to synchronize their motion when a vacuum/pressure input is applied, creating parallelized motion. These parallelize actuators are useful for simplifying the control system in soft machines by generating multiple concordant outputs using a single pneumatic input. These patterns can all be infinitely extended to make arbitrarily large actuator arrays (as suggested by grey areas of the diagrams).

Figure 8A:
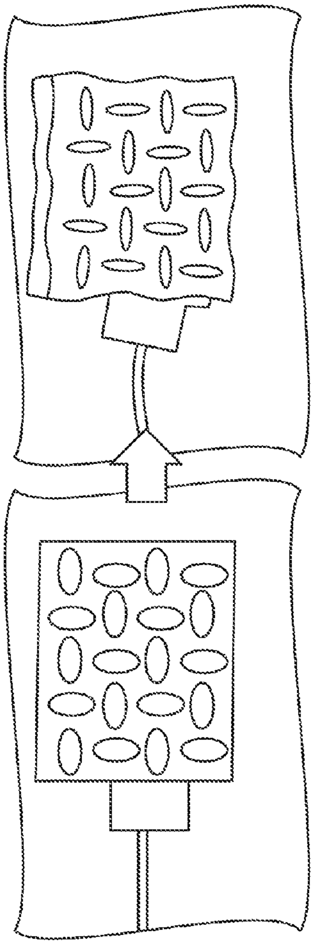
FIG. 8A) illustrates a buckling actuator's buckling actuation when the cells were depressurized, according to one or more embodiments described herein.

Since CAD assisted molding is a scalable method of fabrication, structures consisting of more than one output can be built. FIG. 8 shows a few different kinds of buckling actuators according to one or more embodiments. FIG. 8A shows a buckling actuator with a 3×4 array of actuation units. Multiple "pillars" undergo torsion in opposite directions. Here, the long and short axes of the elliptical holes in the material are 10 mm and 6 mm, giving rise to a maximum rotation angle of about 31 degrees. Each unit rotates ~31 degrees upon deflation of the structure, and is able to individually generate torque.

Figure 8B:
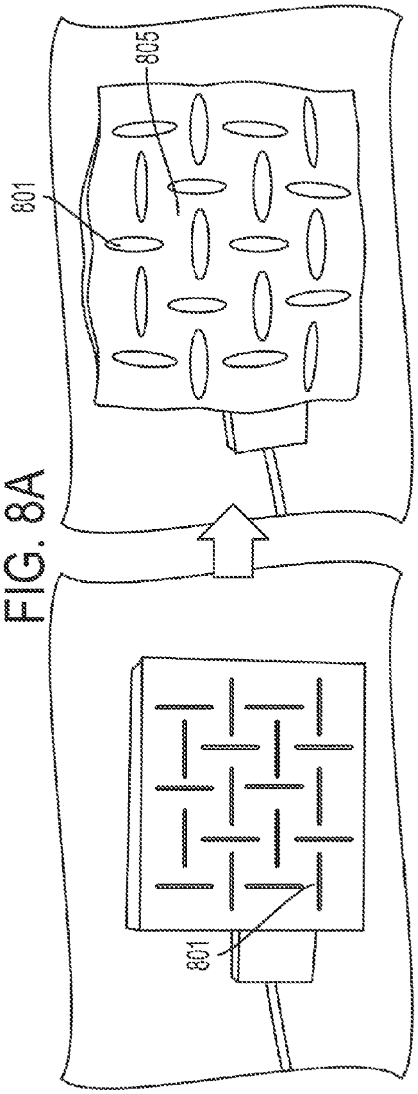
FIG. 8B) illustrates a buckling actuator, where the cells, e.g., spheres, expand instead of collapse, according to one or more embodiments described herein.

In some embodiments, buckling actuators actuated using pressures above the atmospheric pressure are described (FIG. 8B). Here, the cells in the rubber are slits 801 shaped instead of sphere shapes. Instead of collapsing under pressure, the slits expand instead of collapse (see expanded slit 801 on the right of FIG. 8B). To achieve this goal, the shape of the holes is slits (1 mm×14 mm). Upon inflation, the slits expand into larger ellipses (which is the inverse of how the contraction-type buckling actuators change shape). This design has the virtue of not being limited by a maximum pressure. In the case of the previous buckling actuator, the maximum compression one can apply to the block is 1 atm, which happens when perfect vacuum is applied to the inside of the actuator. The reverse buckling actuator, however, can take as much pressure as the material can withstand, as it operates in extension mode instead of compression mode. The positive pressure one can apply is not limited by this system. In this particular design, the slits sizes are 1 mm by 14 mm. The array unit length is still 10 mm. One can also make smaller actuators for faster actuation, as a smaller balloon requires less air volume to inflate/deflate, provided the same pressure and tube size. The one in the figure is able to operate at more than 2 Hz. Upon actuation, the actuator rotates around the rotation center 805. Here, the long and short axes of the elliptical holes in the material are 10 mm and 4 mm, giving rise to a maximum rotation angle of about 39 degrees.

Figure 8C:
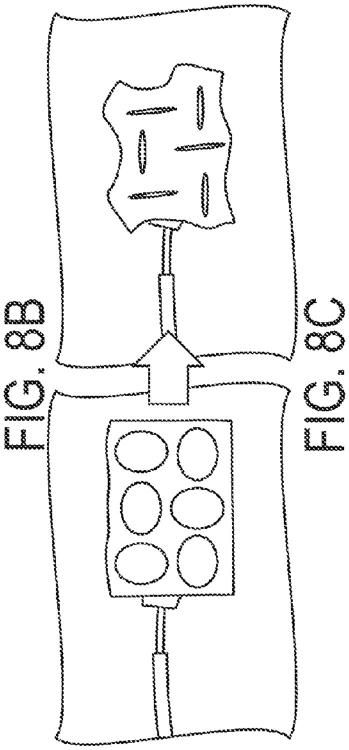
FIG. 8C) shows a soft actuator with a smaller size, according to one or more embodiments described herein.

Speed of actuation is based on the change in volume needed for actuation, and the flow rate of gas being transferred in and out of the structure. For a given flow rate, smaller structures can actuate at a frequency faster than larger structures. FIG. 8C) shows smaller actuators require less air volume to inflate/deflate, and are able to actuate faster. Specifically, FIG. 8C) shows buckling actuator with 2 actuation units that can operate at 2 Hz. The major and minor axes of the elliptical holes in the material are 10 mm and 8 mm, respectively. This geometry yields a maximum angle of rotation of ~39 degrees.

Method of Actuation

In another aspect, a method of actuation is described, including: providing the soft actuator or the actuating device of any one of embodiments described herein; and deflating the cells or over-inflating the cells of the plurality of the soft actuators to cause the bucklable, elastic structural component to buckle and to generate a force available for actuation. In the embodiments where the soft actuator includes a plurality of the cells, the cells can be deflated or over-inflated simultaneously or independently.

While for purposes of illustration a preferred embodiments of this invention has been shown and described, other forms thereof will become apparent to those skilled in the art upon reference to this disclosure and, therefore, it should be understood that any such departure from the specific embodiments shown and described are intended to fall within the spirit and scope of this invention.

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

We claim:

1. A soft actuator, comprising:

a rotation center having a center of mass;

a plurality of bucklable, elastic structural components each comprising a wall defining an axis along its longest dimension, the wall connected to the rotation center in a way that the axis is offset from the center of mass in a predetermined direction; and a plurality of cells each disposed between two adjacent bucklable, elastic structural components and configured for connection with a fluid inflation or deflation source;

wherein upon the deflation of the cell, the bucklable, elastic structural components are configured to buckle in the predetermined direction.

2. The soft actuator of claim 1, wherein all of the bucklable, elastic structural components are configured to bend clockwise.

3. The soft actuator of claim 1, wherein all of the bucklable, elastic structural components are configured to bend counter-clockwise.

4. The soft actuator of claim 1, wherein the two or more bucklable, elastic structural components are located symmetrically around the rotation center.

5. The soft actuator of claim 1, wherein the soft actuator comprises 3, 4, 5, 6, 7, 8, or more bucklable, elastic structural components.

6. The soft actuator of claim 1, wherein the wall defines the wall of the cells.

7. The soft actuator of claim 1, wherein the bucklable, elastic structural component is configured to buckle upon the deflation of the cell and return to its original position when the deflated cell is re-inflated.

8. The soft actuator of claim 1, further comprising two or more secondary structural components structurally linked to the cell, wherein the secondary structural component is stiffer than the bucklable, elastic structural component and configured not to buckle before the bucklable, elastic structural component upon the deflation of the cell.

9. The soft actuator of claim 8, wherein the bucklable, elastic structural component and the secondary structural component are two of the walls of the cell.

10. The soft actuator of claim 1, wherein the bucklable, elastic structural component is in the form of a pillar, level, beam or in an arc shape, a star sharp, or a diamond shape.

11. The soft actuator of claim 1, wherein the cell is in the shape of a rod, sphere, slit, triangular prisms, square prisms, or cylinder.

12. The soft actuator of claim 1, wherein the soft actuator comprises two or more cells connected to each other and configured for connection to the fluid inflation or deflation source but are otherwise isolated from the outside atmosphere.

13. The soft actuator of claim 12, wherein the cell is connected to a fluid chamber configured for connection with the fluid inflation or deflation source.

14. The soft actuator of claim 12, wherein the soft actuator comprises two or more cells configured for connection with the same fluid inflation or deflation source.

15. The soft actuator of claim 12, wherein the soft actuator comprises two or more cells and at least two of the cells are connected to different fluid inflation or deflation sources.

16. The soft actuator of claim 1, further comprising a fluid inflation or deflation source, wherein the source is a gas pump, a gas vacuum, or a gas pump and vacuum.

17. The soft actuator of claim 1, wherein the soft actuator further comprises a hard body portion.

18. The soft actuator of claim 17, wherein the soft actuator is a robotic grabber, a robotic walker, or a robotic swimmer.

19. An actuating device comprising a combination of two or more soft actuators each according to claim 1.

20. The actuating device of claim 19, wherein each of the soft actuator is configured for connection with the same fluid or vacuum source or at least two of the soft actuators are configured for connection with different fluid or vacuum sources capable of being activated independently.

21. The actuating device of claim 19, wherein the actuating device is an actuating array and each of the soft actuator is configured for connection with the same fluid or vacuum source.

22. A method of actuation, comprising:

providing the soft actuator of claim 1; and deflating the cells or over-inflating the cells to cause the bucklable, elastic structural components to buckle and the rotation center to rotate.

23. A method of actuation, comprising:

providing the actuating device of claim 19; and deflating the cells or over-inflating the cells of the plurality of the soft actuators to cause the bucklable, elastic structural components to buckle and the rotation centers to rotate.

24. The method of claim 23, wherein the cells of the plurality of the soft actuators are deflated or over-inflated simultaneously or independently.

* * * * *